United States Patent [19]
Grohman

[11] Patent Number: 5,415,921
[45] Date of Patent: May 16, 1995

[54] COEXTRUDED MULTILAYER VINYL CHLORIDE POLYMER LAMINATES

[75] Inventor: Martin Grohman, Marietta, Ohio

[73] Assignee: General Electric Company, Pittsfield, Mass.

[21] Appl. No.: 53,929

[22] Filed: Apr. 27, 1993

[51] Int. Cl.[6] ............................................. B32B 7/02
[52] U.S. Cl. ................................. 428/216; 428/518; 428/519; 428/520; 428/521; 428/522; 525/67
[58] Field of Search ........ 425/518, 216, 519, 520–522; 525/67

[56] References Cited

U.S. PATENT DOCUMENTS

| | | | |
|---|---|---|---|
| 3,251,904 | 5/1966 | Souder et al. | 260/828 |
| 3,971,835 | 7/1976 | Myers et al. | 260/876 R |
| 4,014,842 | 3/1977 | Kosugi et al. | 260/29.6 R X |
| 4,160,793 | 7/1979 | Kraft et al. | 525/230 |
| 4,169,180 | 9/1979 | McDonagh | 428/215 |
| 4,206,103 | 6/1980 | Kromolicki et al. | 260/28.5 |
| 4,448,932 | 5/1984 | Ozari et al. | 520/78 |
| 4,515,918 | 5/1985 | Nouvertne et al. | 524/504 |
| 4,731,405 | 3/1988 | Kirsch et al. | 524/408 |
| 4,732,935 | 3/1988 | Katto et al. | 525/67 |
| 5,008,323 | 4/1991 | Favstritsky et al. | 526/469 |

FOREIGN PATENT DOCUMENTS

| | | |
|---|---|---|
| 996329 | 9/1972 | Canada . |
| 0298282 | 1/1989 | European Pat. Off. . |
| 0473379 | 3/1992 | European Pat. Off. . |
| 2386579 | 12/1978 | France . |

*Primary Examiner*—Edith Buffalow

[57] ABSTRACT

A laminate which is useful as a construction material is disclosed. The laminate has a substrate layer which contains vinyl chloride polymer, a butadiene rubber graft copolymer, and has a superstrate layer which contains vinyl chloride polymer, butylacrylate rubber graft copolymer, and titanium dioxide. The superstrate layer protects the substrate layer from excessive exposure to ultraviolet light, heat and moisture, and thereby protects the substrate layer from weathering during outdoor use of the laminate as a material for siding, gutter systems, downspouts, shutters, window casings, and other exterior outdoor weather exposed building material applications.

9 Claims, 1 Drawing Sheet

COEXTRUDED MULTILAYER VINYL CHLORIDE POLYMER LAMINATES

BACKGROUND OF THE INVENTION

Field of the Invention

The present invention relates to a coextruded multilayer laminate which is useful as an outdoor construction material, and more particularly relates to coextruded multilayer laminates which have a protective vinyl chloride polymer superstrate layer and a protected vinyl chloride polymer substrate layer.

Description of the Related Art

The use of vinyl chloride polymers as resin compositions for forming construction materials for external use, for example, residential siding, is known, see Canadian Patent No. 996,329 and McDonagh, U.S. Pat. No. 4,169,180, issued Sep. 25, 1979, which is incorporated herein by reference. Such materials have typically required impact modification, and typically butylacrylate rubber based graft copolymers, such as 2-propenoic acid 2-methyl methylester polymer with less than 10% 1,3 butadiene and butyl 2-propenoate polymer or methyl methacrylate butylacrylate polymer graft polymers, have been used to impact modify these vinyl chloride polymer compositions due to the inherent weatherability of butylacrylate rubbers. Butadiene type graft copolymers, such as acrylonitrile-butadiene-styrene graft copolymers have not typically been utilized to impact modify such vinyl chloride polymeric compositions, due to the historically perceived weatherability problems of such materials for external siding applications. Note the teachings of the McDonagh patent, U.S. Pat. No. 4,169,180, issued Sep. 25, 1979, which on column 1, line 65 to column 2, line 5, sets out that resins such as acrylonitrile-butadiene-styrene, methylmethacrylate-butadiene-styrene, and high impact polystyrene have the necessary strength to be used as outdoor construction materials, but which nevertheless undergo deterioration in their mechanical properties or discoloration when used outdoors and subjected to ultraviolet light and environmental degradation.

The use of butylacrylate rubber graft polymers as impact modifiers for vinyl chloride polymeric compositions requiring resistance to the weathering elements of heat, ultraviolet light, and moisture, have, however, had several problems, including relatively low impact strength compared to similar rubber loadings of butadiene based graft polymers, and have typically caused the vinyl chloride polymer compositions to fuse too slowly resulting in the vinyl chloride polymers not obtaining their desired level of natural ductility due to failure to knit well, thereby requiring processing aids and higher processing temperatures and limiting output rates. Impact strength of the vinyl chloride compositions containing the butylacrylate graft polymer can be enhanced by utilizing more butylacrylate (for example, to improve the low temperature impact of the composition), and more processing aids can be employed in the compositions, but both of these add undesired increased material costs to the final product.

Accordingly, there is a need to provide vinyl chloride polymer compositions for outdoor construction materials which exhibit improved low temperature impact strengths at a given rubber loading level, which exhibit increased fusion speeds for the vinyl chloride polymer without the utilization of excessive processing aids, and which utilizes butadiene based graft copolymers avoiding perceived weatherability issues associated with such materials in outdoor construction applications.

SUMMARY OF THE INVENTION

Figure 1:
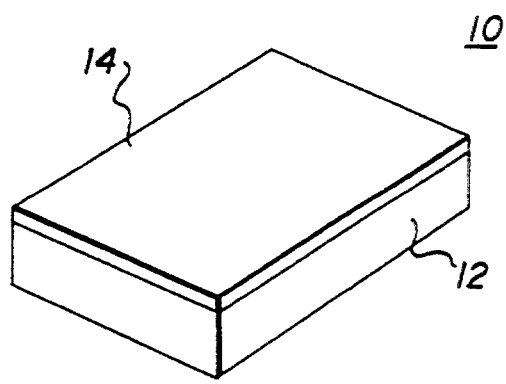
FIG. 1 is a perspective view of a multilayered laminate according to the present invention.

The present invention involves a coextruded multilayer laminate (10) which is suitable for use as an outdoor construction material which comprises:

(a) a substrate layer (12) made of a resin composition comprising a vinyl chloride polymer, a butadiene rubber graft copolymer, and (b) a superstrate layer (14) attached (either directly or indirectly through intermediate thermoplastic layers) to and overlying the substrate layer to protect the substrate layer from weathering elements such as heat, moisture and ultraviolet light, the superstrate layer being made of a polymeric composition comprising vinyl chloride polymer, alkylacrylate rubber graft copolymer (preferably butylacrylate rubber graft copolymer), and titanium dioxide. The butylacrylate rubber graft polymer provides the superstrate with impact resistance, and the titanium dioxide in the superstrate provides the substrate with protection from ultraviolet light.

DETAILED DESCRIPTION OF THE INVENTION

A coextruded multilayered laminate (10) which is useful as an outdoor construction material, for example, as material for siding, gutter systems, downspouts, soffit and fascia systems, shutters, window casing and the like, which comprises:

(a) a substrate layer (12) of a thermoplastic resin composition comprising vinyl chloride polymer and a butadiene rubber graft copolymer, and (b) a superstrate layer (14) of a polymeric composition comprising a vinyl chloride polymer, a butylacrylate rubber graft copolymer, and titanium dioxide, wherein the substrate layer is attached to the superstrate layer, and the superstrate layer provides the substrate layer with improved weather resistance, and the substrate layer provides the superstrate layer with enhanced impact strength and ductility.

The vinyl chloride polymer employed in the superstrate layer and in the substrate layer may be different or the same as each other. The vinyl chloride polymer may be a homopolymer of vinyl chloride, or a copolymer thereof with minor proportions of other ethylenically unsaturated compounds copolymerized therewith. In a preferred form of this invention, the vinyl chloride resin is a simple homopolymer of vinyl chloride, since the hardest and most rigid compositions are obtainable with the homopolymers of vinyl chloride, however, the resin may contain up to 20% of other unsaturated compounds copolymerizable with vinyl chloride without detracting from the essential nature of the vinyl chloride resin. Conversely stated, the resins should have at least 80% of vinyl chloride copolymerized therein. Suitable unsaturated compounds include, for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like.

The alkylacrylate rubber graft polymer for the superstrate is preferably selected from the group consisting of graft copolymers obtained by grafting from 10 to 50 percent by weight of a monomer selected from a group consisting of vinyl aromatics, vinyl cyanides, alkyl methacrylates and mixtures thereof, to 50 to 90 percent by weight of a alkylacrylate (preferably butylacrylate) rubber graft base based on the total weight of the butylacrylate graft copolymer. Alkylacrylate rubbers are preferably polymers of acrylic acid butylesters, optionally containing up to 40% by weight, of other copolymerisable, ethylenically unsaturated monomers. Preferred copolymerisable monomers for the alkylacrylate rubbers include $C_1$–$C_8$ alkyl acrylic acid esters, for example methyl, ethyl, octyl and 2-ethylhexyl esters; haloalkyl esters, preferably halo-$C_1$–$C_8$ alkyl esters, such as chloroethyl acrylate and aromatic esters, such as benzyl acrylate and phenethyl acrylate. They may be used either individually or in admixture. The alkylacrylate rubbers are preferably ethylacrylate rubber or butylacrylate rubber and most preferably butylacrylate rubber. Suitable alkylacrylate rubber graft copolymers include acrylonitrile-ethylacrylate-styrene, acrylonitrile-butylacrylate-styrene, and methyl methacrylate-butylacrylate-styrene graft copolymers.

The butylacrylate rubbers may be uncross-linked or cross-linked, preferably partially cross-linked small (<10%) amounts of butadiene may be used to improve performance.

Monomers containing more than one polymerisable and double bond may be copolymerised with the butylacrylate for cross-linking the butylacrylate rubber. Preferred examples of cross-linking monomers are esters of unsaturated monocarboxylic acids containing from 3 to 8 carbon atoms and unsaturated monohydric alcohols containing from 3 to 12 carbon atoms or saturated polyols containing from 2 to 4 OH-groups and from 2 to 20 carbon atoms, such as ethylene glycol dimethylacrylate and allyl methacrylate; polyunsaturated heterocyclic compounds, such as trivinyl and triallyl cyanurate and isocyanurate, tris-acryloyl-s-triazines, particularly triallyl cyanurate; and polyfunctional vinyl compounds, such as di- and tri-vinyl benzenes, and also triallyl phosphate and diallyl phthalate. Preferred cross-linking monomers are allyl methacrylate, ethylene glycol dimethacrylate, diallyl phthalate and heterocyclic compounds containing at least three ethylenically unsaturated groups. Particularly preferred cross-linking monomers are the cyclic monomers triallyl cyanurate, triallyl isocyanurate, trivinyl cyanurate, triacryloyl hexahydros-triazine and triallyl benzenes. The cross-linking monomers are preferably used in quantities of from 0.02 to 5%, by weight, more preferably from 0.05 to 2%, by weight, based on the butylacrylate rubber.

In the case of cyclic cross-linking monomers containing at least three ethylenically unsaturated groups, it is advantageous to limit the quantity to <1%, by weight, of butylacrylate rubber.

Preferred copolymerisable, ethylenically unsaturated monomers for the butylacrylate rubber which, in addition to the acrylic acid esters, may optionally be used as comonomers with the butylacrylate for producing the butylacrylate rubber are, for example, acrylonitrile, styrene, α-methyl styrene, acrylamides and vinyl-$C_1$–$C_6$ alkyl ethers. Preferred butylacrylate rubbers as the graft base are emulsion polymers having a gel content of <60%, by weight. The gel content of the graft base is determined in dimethyl formamide at 25° C.

Acrylate rubbers as the graft base may also be products containing a cross-linked diene rubber of one or more conjugated dienes, such as polybutadiene, or a copolymer of a conjugated diene with an ethylenically unsaturated monomer, such as styrene and/or acrylonitrile as the core.

Preferred graft monomers for grafting onto the butylacrylate rubber are G-methyl styrene, styrene, acrylonitrile, methyl methacrylate or mixtures thereof. Preferred graft monomer mixtures are mixtures of styrene and acrylonitrile in a ratio, by weight, of from 90:10 to 50:50.

Graft polymers based on butylacrylate rubber are described, for example, U.S. Pat. No. 4,022,748 and in U.S. Pat. No. 4,096,202 which are incorporated herein by reference. The average particle diameter, $d_{50}$ of butylacrylate rubber graft copolymer in the mixture according to the present invention preferably amounts to from 0.05 to 3 μm, preferably from 0.1 to 2 μm more preferably from 0.1 to 1 μm.

Titanium dioxide, $TiO_2$, is employed as an powder, which can optionally be made hydrophobic, for example, by covering the titanium dioxide surface with hydrophobic plastics or with long chain fatty acids.

The butadiene rubber graft polymer, which is the other component of the thermoplastic resin composition of the present invention and added as an impact strength-increasing agent, is prepared by adding 15 to 50 parts by weight of a monomer mixture of one or more of aromatic vinyl compounds, vinyl cyanides, methacrylic acid alkyl esters, and acrylic acid alkyl esters to 50 to 85 parts by weight of a butadiene-based rubber and then polymerizing the monomer mixture in the presence of the butadiene-based rubber.

The butadiene-based rubber may contain small amounts of cross-linking agents and chain transfer agents. At the time of graft polymerization, small amounts of cross-linking agents or chain transfer agents may be incorporated.

Aromatic vinyl compounds which can be used as the graft component for the butadiene rubber graft copolymer include styrene, α-methylstyrene, chlorostyrene, tert-butylstyrene, and p-methylstyrene. Of these compounds, styrene is most preferred. As the vinyl cyanide, acrylonitrile is most preferred. In addition, methacrylonitrile can be used. Preferred examples of methacrylic acid alkyl esters are those compounds in which the alkyl group has from 1 to 4 carbon atoms, such as methylmethacrylate, n-butyl methacrylate, and ethyl methacrylate.

The graft component as used herein for the butadiene rubber graft copolymer is at least one monomer selected from the group consisting of the above-described aromatic vinyl compounds, vinyl cyanides, methacrylic acid alkyl esters and acrylic acid alkyl esters. In order to increase impact resistance, the graft component preferably comprises 0 to 100% by weight of a methacrylic acid alkyl ester and/or an acrylic acid alkyl ester, 0 to 85% by weight of an aromatic vinyl compound, and 0 to 40% by weight of a vinyl cyanide. Typical examples are a styrene-acrylonitrile mixture, methyl methacrylate alone, a methyl methacrylate-styrene mixture, and a methyl methacrylate-styrene-acrylonitrile mixture.

The butadiene rubber to be used as the rubber component for the butadiene rubber graft copolymer is polybutadiene including butadiene homopolymers and/or butadiene copolymers prepared from a major proportion of butadiene and one or more vinyl monomers copolymerizable with butadiene.

Cross-linking agents which can be used in the polymerization of the butadiene rubber or graft component are those compounds copolymerizable with butadiene or alkyl acrylates. Examples are divinylbenzene, ethylene glycol, dimethacrylate, diethylene glycol dimethacrylate, triethylene glycol dimethacrylate, tetraethylene glycol dimethacrylate, ethylene glycol diacrylate, diethylene glycol diacrylate, triethylene glycol diacylate, trimethylolpropane trimethacrylate or acrylate, 1,3-butanediol dimethacrylate, and 1,3-butanediol diacrylate.

As chain transfer agents, known compounds such as n-octylmercaptan, n-dodecylmercaptan, and tert-dodecylmercaptan can be used.

Butadiene rubber graft copolymer can be prepared by polymerization procedures that are commonly used. Especially preferred is an emulsion polymerization method. To further improve the impact resistance of the composition, it is preferred to use a rubber latex having a mean particle size of at least 1,500 Angstroms. This rubber latex can be prepared by known emulsion polymerization procedures. These large particle sized rubber latexes can be prepared by known techniques such as a multi-stage seed polymerization method and a micro-coagulation method in which small particle sized rubber latexes are coagulated with additives such as acids, salts, and water-soluble polymers. The micro-coagulation method is simpler in operation to conduct.

Micro-coagulation can be carried out by known procedures using inorganic acids such as hydrochloric acid, organic acids such as tartaric acid, malic acid and acetic acid, water-soluble polymers such as polyethylene oxide and polyvinyl alcohol, salt, metal salts such as magnesium chloride, combinations of peroxides and formaldehydesulfoxylic acid salts, and so forth.

With regard to the ratio of the rubber component to the graft component, the butadiene rubber graft polymer comprises 50 to 85 parts by weight of the rubber component and 15 to 50 parts by weight of the graft component, provided that the sum of the rubber and graft components is 100 parts by weight, in order to increase the effect of imparting impact resistance and further to facilitate post-treatments such as salting and drying. Graft polymerization may be performed in either one stage or multiple stages. Moreover, it may be performed while continuously feeding the monomer mixture.

In addition to the aforementioned components, the compositions of the layers of the present invention can contain or be free of various other additives, which enhance specific desired properties of the compositions. Representative additives include heat and light stabilizers, antioxidants, lubricants such as stearates, stearamides, or paraffins fillers (e.g., calcium carbonate, clay, etc.), reinforcing agents (e.g., glass fibers), additional flame retardant and/or smoke suppressant additives (e.g., antimony oxide, aluminum trihydrate, etc.), and pigments (e.g. carbon black, etc.).

The blend compositions of this invention can be formulated from the components thereof by any of the commonly used compounding techniques including single or twin screw extrusion, two-roll or Banbury milling, and the like. The laminates may be formed into shapes or articles by extrusion preferably twin-screw extrusion, calendaring, compression molding, or any other fabrication method which is suitable for shaping thermoplastic laminates.

The superstrate is made of a polymeric composition which contains vinyl chloride polymer, butylacrylate rubber graft polymer, titanium dioxide, and optionally may either contain or be free of various additives as set out above. The polymeric composition preferably contains vinyl chloride polymer present at a level of from 50 to 98 percent by weight based on the entire weight of the polymeric composition, more preferably present at a level of from 70 to 91 percent by weight thereof, and most preferably present at a level of from 80 to 87 percent by weight thereof. The polymeric composition preferably contains butylacrylate rubber graft copolymer present at a level of from 1 to 10 percent by weight based on the total weight of the polymeric composition, more preferably from 3 to 7 percent by weight thereof, and most preferably present at a level of from 4 to 6 percent by weight thereof. The polymeric composition preferably contains titanium dioxide present at a level of from 1 to 20 percent by weight based on the total weight of the polymeric composition, more preferably present at a level of from 5 to 15 percent by weight thereof, and most preferably present at a level of from 8 to 12 percent by weight thereof. The polymeric composition may contain or may be free of additives such as those listed above, and for example, may contain from 0 to 20 percent by weight of the additives based on the total weight of the polymeric composition, for example, from 1 to 10 percent by weight thereof, and also, for example, from 1 to 5 percent by weight thereof.

The substrate layer is made of a resin composition which contains vinyl chloride polymer and butadiene rubber based graft polymer. The resin composition may further contain or may be free of titanium dioxide and/or the additives set out above. The resin composition preferably contains from 50 to 99 percent by weight vinyl chloride polymer based on the total weight of the polymeric composition, preferably from 79 to 96 percent by weight thereof, and most preferably from 87 to 95 percent by weight thereof. Preferably the resin composition contains the butadiene rubber graft copolymer present at a level of from 1 to 10 percent by weight based on the total weight of the resin composition, more preferably from 2 to 6 percent by weight thereof, and most preferably from 3 to 5 percent by weight thereof. The resin composition may contain titanium dioxide present at a level of from 0 to 20 percent by weight based on the total weight of the resin composition, for example, from 1 to 10 percent by weight thereof, also, for example, from 1 to 5 percent by weight thereof, and additionally, for example, from 1 to 3 percent by weight thereof. The resin composition may further contain additives as set out above present at a level of from 0 to 20 percent by weight based on the total weight of the resin composition, more preferably from 1 to 10 percent by weight thereof, and most preferably from 1 to 5 percent by weight thereof.

The polymeric composition for the superstrate layer is preferably free of butadiene rubber graft copolymer, and the resin composition for the substrate layer is preferably free of butylacrylate rubber graft copolymer.

The coextruded multilayered laminate may either comprise, consist essentially of or consist of the superstrate/substrate layers. By the term consisting essentially of, it is meant that the basic and novel characteristic of the protective function of the superstrate layer which contains vinyl chloride polymer, weatherable butylacrylate rubber graft polymer, and ultraviolet light screening titanium dioxide, is the only protective layer employed to protect the substrate layer containing the weather sensitive butadiene rubber based graft copolymer.

Preferably the superstrate and substrate both contain amounts of titanium dioxide so that the two layers can be substantially color matched.

The superstrate layer preferably has a thickness of from 0.001 to 0.15 inches, more preferably from 0.001 to 0.020 inches and most preferably from 0.005 to 0.010 inches. The substrate preferably has a thickness of from 0.01 to 0.30 inches, more preferably from 0.02 to 0.10 inches, and most preferably from 0.03 to 0.06 inches. Preferably the substrate is at least twice as thick as the superstrate, so that the substrate is the primary structural element while the superstrate functions primarily as a protective layer for the substrate layer.

The following examples illustrate the present invention, but are not meant to limit the scope thereof.

EXAMPLES

Example 1

A Coextruded polyvinyl chloride article was made according to the present invention employed a substrate layer (base layer) (0.32 mil thick) of formulation C (a butadiene rubber graft copolymer impact modified polyvinyl chloride composition) and a superstrate layer (cap layer) (0.08 mil thick) of formula B (a butylacrylate rubber graft copolymer impact modified polyvinyl chloride composition).

Comparative Example CEX2

A comparative coextrude polyvinyl chloride article was made employing a substrate layer (0.32 mil thick) of formulation A (a butylacrylate rubber graft copolymer impact modified polyvinyl chloride composition) and a superstrate layer (0.08 m.l thick) of Formula B (a butylacrylate rubber graft copolymer impact modified polyvinyl chloride composition).

Formulation A 100 parts by weight (pbw) polyvinyl chloride, 0.8 parts by weight tin stabilizer, 1.6 parts by weight calcium stearate, 1.5 parts by weight paraffin wax, 0.3 pbw oxidized polyethylene wax, 10 pbw $CaCO_2$(<1 $\mu$m), 3 pbw $TiO_2$, 5 pbw methyl methacrylate-styrene-butylacrylate graft copolymer (80 weight % rubber based on the total weight of the graft copolymer), 1 pbw polymethyl methacrylate processing aid).

Formulation B 100 parts by weight (pbw) polyvinyl chloride resin, 5 pbw methyl methacrylate-styrene-butylacrylate graft copolymer (60 weight % rubber), 10 pbw $TiO_2$ plus additives as for formulation A.

Formulation C 100 pbw polyvinyl chloride resin, 0.8 pbw tin stabilizer, 0.8 pbw calcium stearate, 1.5 pbw paraffin wax, 0.3 pbw oxidized polyethylene wax, 10 pbw $CaCO_3$(<1 $\mu$m), 3 pbw $TiO_2$, 4 pbw methyl methacrylate-butadiene-styrene (70 weight % rubber), 0.3 pbw polymethyl methacrylate processing aid.

TABLE 1

| Properties of the Coextruded Articles | | |
|---|---|---|
| Example | 1 | CEX2 |
| Dart Impact (#/mil) | | |
| 23° C. | 3 | 2.7 |
| 0° C. | 2 | 1.8 |
| Fusion Time (minutes) | 0.9 | 1.1 |
| Output (1000 lb/hr) | 1.17 | 1.15 |

Note that improved properties were obtained even though lower rubber loadings were employed for the butadiene based substrate formulation. Note also the need for less processing aid and lubricant in the butadiene based substrate system.

I claim:

1. A coextruded multilayer laminate comprising:
   (a) a substrate layer of a thermoplastic resin composition comprising
      (i) from 50 to 99 percent by weight vinyl chloride polymer based on the entire weight of the resin composition,
      (ii) from 1 to 10 percent by weight of a butadiene rubber graft copolymer based on the total weight of the resin composition, said graft copolymer being selected from the group consisting of graft polymer obtained by grafting from 15 to 50 percent by weight of a monomer selected from the group consisting of vinyl aromatics, vinyl cyanides, methacrylic alkyl esters, and mixtures thereof to 50 to 85 percent by weight of a butadiene rubber based on the total weight of the butadiene rubber graft polymer,
   (b) a superstrate layer attached to said substrate layer to protect said substrate layer from heat, moisture and ultraviolet light, said superstrate layer comprising a polymeric composition comprising,
      (i) from 50 to 98 percent vinyl chloride polymer based on the total weight of the polymeric composition,
      (ii) from 1 to 10 percent by weight of a alkyl acrylate rubber graft copolymer based on the total weight of the polymeric composition, said alkyl acrylate rubber graft copolymers being selected from the group consisting of graft copolymers obtained by grafting from 10 to 50 percent by weight of a monomer selected from the group consisting of vinyl aromatics, vinyl cyanides, methylacrylic alkyl esters and mixtures thereof to 50 to 90 percent by weight of a alkyl acrylate rubber based on the total weight of the alkyl acrylate graft copolymer, and
      (iii) from 1 to 20 percent by weight titanium dioxide based on the total weight of the polymeric composition.

2. The laminate of claim 1 wherein said laminate consists essentially of said substrate layer and said superstrate layer.

3. The laminate of claim 1 wherein said laminate consists of said superstrate layer and said substrate layer.

4. The laminate of claim 1 wherein said butadiene rubber graft polymer is selected from the group consisting of acrylonitrile-butadiene-styrene polymers and methyl methacrylate-butadiene-styrene polymers.

5. The laminate of claim 1 wherein said alkyl acrylate rubber graft polymer is selected from the group consisting of methyl methacrylate-butylacrylate-styrene graft polymers.

6. The laminate of claim 1 wherein said substrate layer has a thickness of from 0.01 to 0.3 inch; said superstrate has a thickness of from 0.001 to 0.1 inch.

7. The laminate of claim 6 wherein said substrate layer has a thickness of from 0.03 to 0.06 inch.

8. The laminate of claim 1 wherein said polymeric composition comprises from 70 to 91 percent by weight vinyl chloride polymer, from 3 to 7 percent by weight butylacrylate rubber graft polymer, and from 5 to 15 percent by weight titanium dioxide.

9. The laminate of claim 1 wherein said substrate comprises from 79 to 96 percent by weight vinyl chloride polymer, from 1 to 10 percent by weight butadiene rubber graft polymer, from 1 to 5 percent by weight titanium dioxide.

* * * * *